No. 771,125. PATENTED SEPT. 27, 1904.
A. W. CASH.
CEMENT TESTING MACHINE.
APPLICATION FILED AUG. 1, 1903.
NO MODEL. 3 SHEETS—SHEET 1.
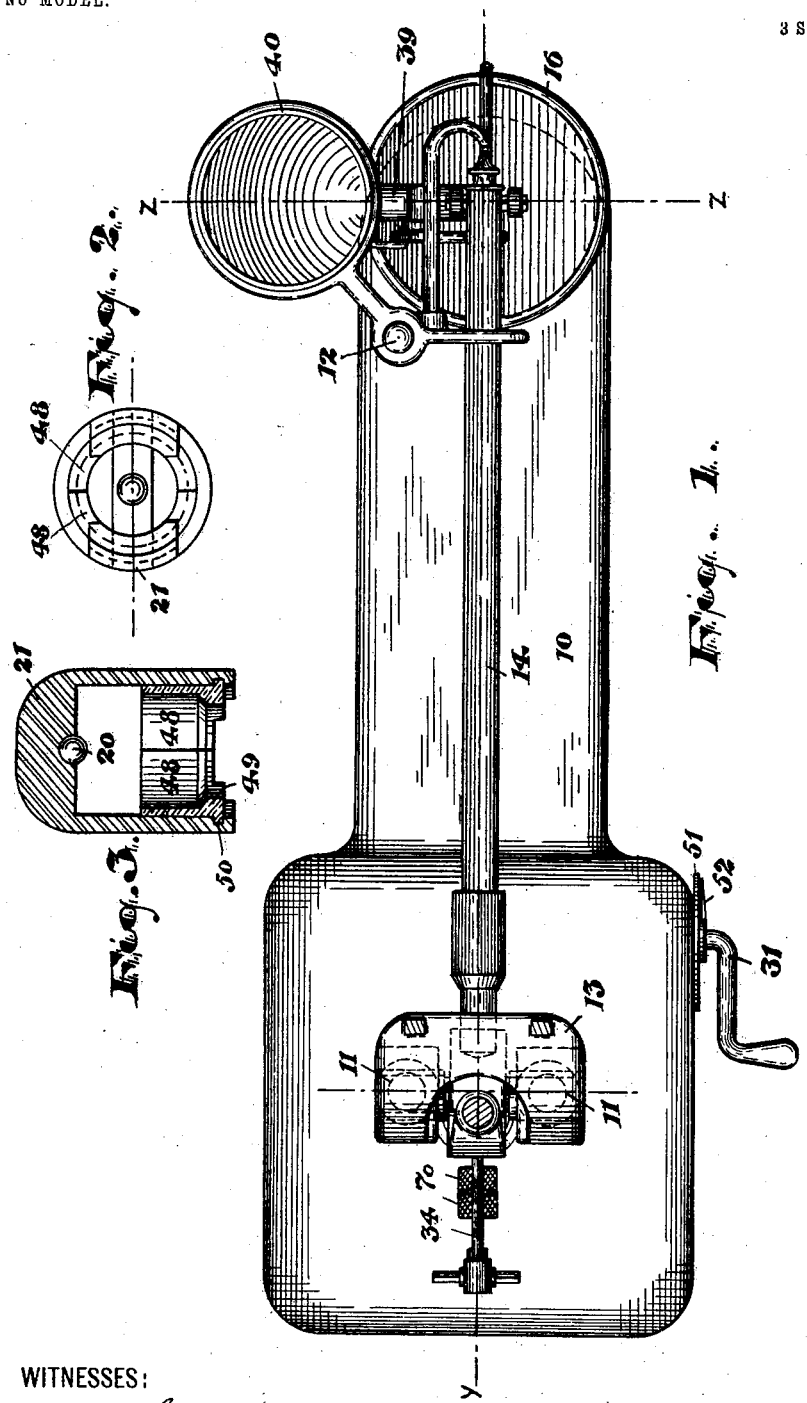
WITNESSES: INVENTOR:
Ralph Lancaster. Arthur W. Cash,
Russell M. Everett BY
Charles H. Pell
ATTORNEY.

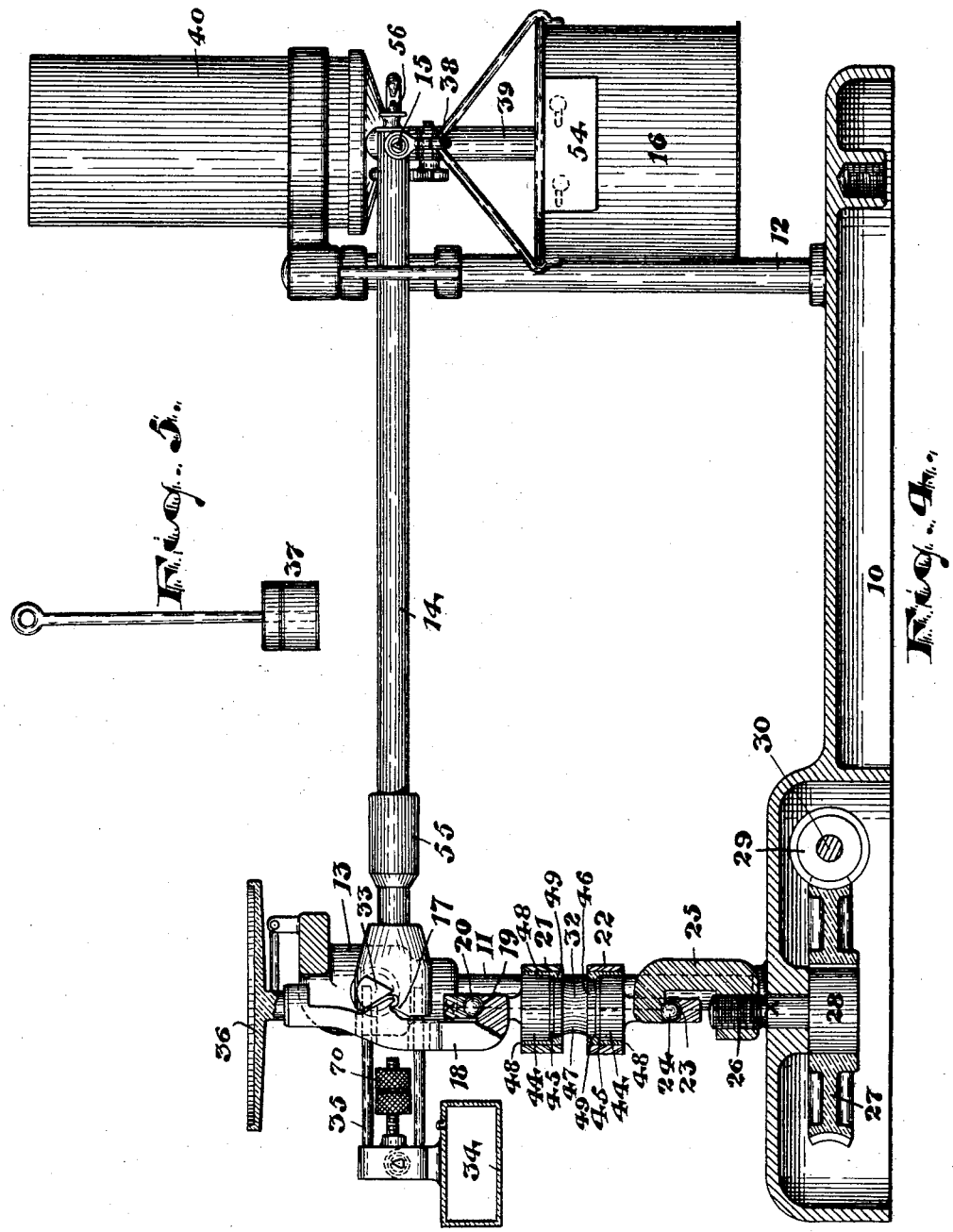

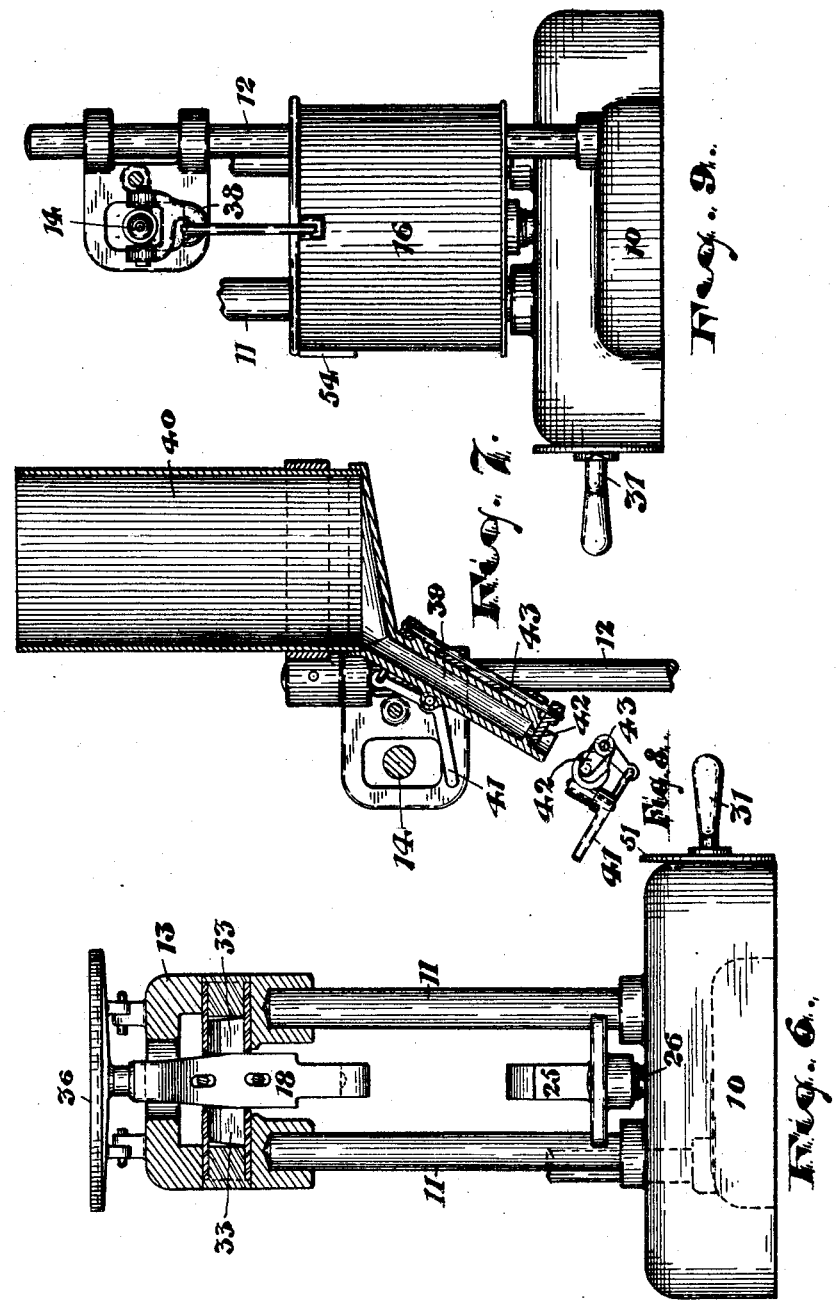

No. 771,125.

Patented September 27, 1904.

UNITED STATES PATENT OFFICE.

ARTHUR W. CASH, OF NEWARK, NEW JERSEY.

CEMENT-TESTING MACHINE.

SPECIFICATION forming part of Letters Patent No. 771,125, dated September 27, 1904.

Application filed August 1, 1903. Serial No. 167,826. (No model.)

*To all whom it may concern:*

Be it known that I, ARTHUR W. CASH, a citizen of the United States, residing at Newark, in the county of Essex and State of New Jersey, have invented and produced a new and original Improvement in Cement-Testing Machines; and I do hereby declare the following to be a full, clear, and exact description of the invention, such as will enable others skilled in the art to which it appertains to make and use the same, reference being had to the accompanying drawings, and numerals of reference marked thereon, which form a part of this specification.

This invention relates to that class of cement-testing machines by means of which a molded briquet of cement or other body of material to be tested may be subjected to a constantly-increasing tensile strain, the strain continuing up to the point of breakage, the improvements relating more particularly to that class of the machines represented by those shown and described in Patents Nos. 313,607 and 517,356.

The objects of the present improvements are to enable the tensile strain to be more uniformly applied to the briquet without shock or jar tending to prematurely rupture said briquet to produce an inexact showing of its tensile strength; to automatically and more perfectly register, for subsequent determination, the amount of tensile strain required to sever the briquet into parts; to provide a mechanism by which the comparative elasticity of two or more briquets of molded and hardened cement or other material under various degrees of strain may be determined; to provide a machine of greater simplicity and reduced cost; to enable the beam or lever on which the severing-weight is suspended to be held constantly at a horizontal, and thus enable a more accurate test to be secured; to obtain increased strength and rigidity of parts, and to secure other advantages and results, some of which may be referred to hereinafter in connection with the description of the working parts.

The invention consists in the improved testing apparatus or device and in the arrangements and combinations of parts of the same, all substantially as will be hereinafter set forth and finally embraced in the clauses of the claim.

Referring to the accompanying drawings, in which like numerals of reference indicate corresponding parts in each of the several figures, Figure 1 is a plan of my improved testing device. Fig. 2 is a detail view of a jaw for clutching a briquet, and Fig. 3 is a section of the same on line $x$. Fig. 4 is a vertical section taken on line $y$ of Fig. 1. Fig. 5 is a detail view of a certain detachable weight. Fig. 6 is a detail section taken on line $z$. Fig. 7 is a sectional view of a shot-reservoir and its valve connections. Fig. 8 is a detail view of a valve or gate controlling the out-passage of shot from said reservoir. Fig. 9 is an end view showing a receptacle for the shot as the latter gravitates.

In said drawings, 10 indicates the base-plate of the machine, on which the posts or uprights 11 12 for supporting certain of the working parts are rigidly secured, said uprights being preferably steel embedded in the base-plate 10. At the top of the posts 11 is arranged a yoke or casting 13. The yoke provides fulcrumal bearings for the weighing beam or lever 14, which may be of any usual construction and arrangement. At one side of its fulcrum said beam has a bearing 15, from which the shot-receptacle 16 is suspended, and at or near its opposite end said beam is provided with another bearing, 17, on which the clutch-carrier 18 is seated. Said carrier 18 near its lower extremity is provided with a socket 19 for a ball 20, and on said ball, arranged in said socket, one of the briquet-clutching jaws 21 is supported.

The briquet-clutches 21 22 are of peculiar construction and embody important features of novelty, which will be duly explained. The clutch members 21 22 grasp or clutch the opposite ends of the briquet, and thus arranged and in connection with coöperating means tend to draw the opposite ends of the briquet asunder under the stress or strain induced by the weights in the receptacle 16, as will be hereinafter more fully described. The clutch member 22 is provided with a ball-socket 23, in which the ball 24 is arranged, and on this said ball 24 is a link or connection 25, also provided with a socket for the ball 24. At the lower end of said link or connection the same is provided with a female thread to receive the screw-shaft 26 of the worm-wheel 27. Said screw-shaft 26 has bearings in the base plate or casting 10, the head 28 of the shaft bearing upward against the under side of said bed-plate. Said bed-plate is chambered on the under side to receive the head 28, worm-wheel 27, and coöperating worm-wheel 29, which is arranged on a crank-shaft 30 and engages the periphery of the worm-wheel 27. The crank-shaft and its wheel 29 are turned by a hand-crank 31, the said crank being stationed on the outside of the bed-plate 10, preferably at the front of the same, convenient for hand manipulation.

It may be noted that in operating the device to test the tensile strength of the briquet the beam at its free end carrying the receptacle 16 lowers as shot or weighty matter is supplied thereto. The departure of the beam from the horizontal position shown changes the leverage and tends to vary the tensile draft of the weight as the inclination of the beam increases. By turning the hand-crank 31, the wheels 29 27, and screw 26 the link or connection 25, which is prevented from turning with the screw-shaft by being arranged in a slideway formed by the standards 11 11, is drawn down, and with it the clutch member 22, briquet 32, clutch member 21, and the carrier 18, as will be understood upon reference to Fig. 4. Inasmuch as the carrier 18 engages the bearing 17, lying at a little distance from the fulcrumal lug 33 of the lever or beam 14 on the side opposite the free end supporting the receptacle 16, when said carrier is drawn downward it counteracts the tendency of the weighted beam to assume an inclined position, as above described, so that the said beam may be maintained at a horizontal until the briquet is finally broken under the power of the weights in the receptacle multiplied by the beam-lever.

The lever or beam 14 is provided with a weight-receptacle 34 on its shorter arm or extension 35, adapted to receive shot or weights whereby the weight of the receptacle 16 may be counterbalanced. Said receptacle 34 is preferably adjustable on each beam to enable the balance to be made more accurate and exact. Adjustable weights 70 are also provided.

At the top of the carrier is a tablet or platform 36 for holding the receptacle 16 and its contents when weighing the latter, and when this is used I employ the weight 37, Fig. 5, adapted to be suspended from the same hook 38 from which the receptacle 16 is hung in the briquet-straining operation.

Means are provided for closing the passage 39, leading from the weight-storage reservoir 40, supported on the post or column 12, into the suspended receptacle 16, the closing of said passage being performed automatically by the falling beam. This is preferably accomplished by the beam 14 striking in its quick descent an arm or projection 41, Fig. 8, and the latter in turn turns a valve 42 on its pivot 43 to close the passage. Suitable levers or other mechanical connections between said arm and valve are employed to transmit the antomatic movements from the projection or arm 41 to the valve 42.

The briquet 32 to be tested, Fig. 4, is preferably of the shape shown, being round in plan, with cylindrical heads 44 44 at upper and lower ends, shoulders 45 45 at the inner ends of said heads, reduced cylindrical parts 46 at the inner sides of the shoulders, and a concavously-reduced center part 47, whereat the said briquet will break when subjected to the tensile strain, the said reduced center part being the weakest portion of said briquet to resist said tensile strain. To engage the shoulders and cylindrical heads of the briquet, I have provided semicircular pieces or half-rings 48 48, provided on their inner or concave sides with flanges 49 to engage the shoulders. On their convex sides said half-rings are provided with lugs 50, Fig. 3, to enter suitable slots or receptacles in the clutch members 21 22, said lugs and slots being formed so as to permit a detachment of the half-rings from the said members by making quarter-turn thereof within said members, as will be understood upon reference to Fig. 2. Thus arranged the briquet is prevented from detachment by endwise movement in either direction.

By the construction described when the briquet is within the half-rings and clutching or briquet-holding members 21 22 and the latter are arranged to bear against the balls 20 24 and coöperating parts the weight of the receptacle 16 and contents acts on the lever to effect a draft on said parts in a direct line through the centers of said balls and the longer axis of the briquet, and the strain is brought to bear evenly on all sides of said briquet, so that there will be no rupture of the latter because of a tortional or lateral strain; but the strain will be evenly distributed on all sides of said longer axis, thus occasioning no premature rupture, but a rupture of the briquet at its central and weakest part 47, due to tensile strain alone, thereby securing a more exact test for purposes of comparison, &c. The briquet being arranged in its bearings in the line of the balls 20 24, the valve 42 is opened and the small shot, preferably of lead, run out from the reservoir 40 into the receptacle 16, so that the latter gradually increases its downward draft on the long arm of the beam 14, and thus the strain on the briquet gradually increases until its tensile strength can no longer sustain the multiplied strain. The area of a transverse section of the briquet at its smallest point, (usually one square inch,) the leverage of the beam, and the weight of the shot in the balanced receptacle being known, the tensile strength of the briquet can be readily calculated and determined. At the breakage of the briquet the beam immediately and automatically stops the passage of shot into the receptacle 16. To more easily and exactly hold the beam at its horizontal position, for purposes hereinbefore described, I prefer to employ an indicator or index-hand 56. Attached to the shot-receptacle 16 is an auxiliary weight-plate 54, Fig. 4, separably secured to said receptacle. Said weight is separably attached to the receptacle in any suitable manner. It may be attached, as indicated in broken outline in Fig. 4, by means of headed pins and keyhole-slots, the slots being either in the weight or in the receptacle and the headed pins being correspondingly arranged to enter said slots; but no special invention is involved in the particular manner of attachment, and full illustration of the attaching means is thought not to be necessary for a full understanding of the invention. This is of a weight which when multiplied by the leverage of the beam will effect a predetermined pull or strain on the briquet of, say, ten pounds, the weight of the receptacle 16 itself being nicely counterbalanced by the weight receptacle or holder 34 and its contents. The predetermined initial strain or pull of, say, ten pounds having been brought to bear on the briquet and its holding connections by reason of the said separable weight-plate 54, said parts are immediately brought to their proper bearings before the outflow or passage of the shot begins, and thus there is no danger of sudden jarring and premature breakage of the briquet after a considerable weight of shot has entered the receptacle by the sudden movement of said parts to their said proper bearings, as will be understood. The total amount of strain on the briquet at the moment of rupture may be determined by taking the receptacle 16 and its contents and weight-plate 54 from the hook 38 and placing the same on the platform 36. Then by means of the weight 37 and such additional weights as may be necessary, as well as the sliding poise 55 or other weighing means common in connection with scale-beams, the receptacle and contents are weighed and the tensile strain is obtained. Determination of comparative elasticity of two or more briquets is effected by means of dial-plate 51 and indicator-point 52, adjustably connected to crank 31 in such manner that the indicator-point may readily be set at zero of the dial after the lever or beam has been brought to a horizontal, with the initial strain on the briquet due to weight 54 taken as a starting-point from which to determine comparative elasticity. The crank 31 is of course stopped at the moment of rupture in the briquet, and the position of indicator-point 52 on the dial-plate 51 then gives in computation with worm-gears 27 29 and screw 26 the amount of elasticity in the test-piece up to point of rupture.

I am aware that various modifications may be made in the detail construction of the device without departing from the spirit and scope of the invention, and I therefore do not wish to be understood as limiting myself to the specific structure shown or to the positive descriptive expressions employed in the foregoing specification, excepting as the prior state of the art may require.

Having thus described the invention, what I claim as new is—

1. In a cement-testing machine, the combination with the lever-like beam and means for clutching the opposite ends of the briquet and transmitting the resistance to rupture to said beam, and a weight-receptacle in connection with said beam and adapted to receive the weights for measuring resistance to rupture, of a separable initial-straining weight arranged in connection with the said receptacle and adapted to hold the clutching-jaws positively, with a predetermined straining power, to or upon the briquet preliminary to the feeding of the measuring-weights into the said receptacle, substantially as set forth.

2. In a cement-testing machine, the combination with the lever-like beam, and means for clutching the opposite ends of the briquet and transmitting or carrying the resistance to rupture to said beam and a weight-receptacle in connection with said beam adapted to receive the weights for measuring the resistance, of a separable initial-straining weight applied to said receptacle independent of the weights for measuring the resistance to rupture, and adapted to counterbalance the weight of the briquet and its immediate connections and hold the clutching-jaws positively with a predetermined straining power against the said briquet preliminary to the application of the said measuring-weights, and means for maintaining the beam at a horizontal until rupture of the briquet occurs.

3. The improved cement-testing machine, comprising a beam and means in connection with said beam for clutching the briquet, a weight-receptacle having thereon an initial-straining weight adapted to produce a strain upon the briquet of a predetermined power prior to the act of feeding the measuring-weights into said weight-receptacle, a weight-holder stationed near said receptacle and means for conducting the measuring-weights into the said weight-receptacle and gradually increasing strain upon the briquet from that imposed by the predetermined straining-weight, and means for holding the beam and briquet steadily in normal position notwithstanding the increase of strain thereon, substantially as set forth.

4. In a cement-testing machine the combination with the base-plate having supports for the lever or beam, said lever or beam and a briquet-clutch member in connection with said lever or beam, of a second coöperating brick-clutch member, a screw-shaft in connection therewith, a worm-wheel on said screw-shaft and coöperating worm-wheel having means adapted to be turned by hand and effect a regular and slow movement of said screw-shaft and a steady vertical movement of the clutch members, substantially as set forth.

5. In a testing apparatus, the combination with a fulcrumed beam, of a carrier 18, having a ball-socket, a clutch member, a ball in said ball-socket, half-rings arranged in said clutch member, a coöperating clutch member having half-rings and a ball-socket and its ball, a link 25, having a thread, a screw-shaft having a worm-wheel, and a coöperating worm-wheel and means for turning the same, substantially as set forth.

6. In a testing apparatus, the combination with the briquet-clutching members, having open interior grooves, of half-rings having inner flanges to engage shoulders on the briquet, and exterior lugs adapted to enter the grooves in said clutching members, substantially as set forth.

7. In a testing apparatus, the combination with a scale-beam and weighing appliances, of means to hold the opposite ends of the briquet and means for counteracting the movement due to weighing means and maintaining the scale-beam in a given position as the weight of said weighing means increases, the last-said means comprising a screw having a worm-wheel, a coöperating worm-wheel and a handle for turning the same, the last-said worm-wheel having an index or indicator-point and a dial-plate arranged adjacent to said indicator-point, substantially as set forth.

8. In a testing apparatus, the combination with a scale-beam and its weighing appliances, of means adapted to grasp or clutch the opposite ends of a briquet, a screw and means for turning the same, connections of the means adapted to engage one end of the briquet with the scale-beam and connections of the means adapted to engage the other end of the briquet with the screw, and worm-wheels adapted to be turned to give a slow and steady movement to said screw when turning the same and a hand-crank for turning said worm-wheels, substantially as set forth.

In testimony that I claim the foregoing I have hereunto set my hand this 18th day of July, 1903.

ARTHUR W. CASH.

Witnesses:
CHARLES H. PELL,
C. B. PITNEY.